United States Patent Office
3,590,123
Patented June 29, 1971

3,590,123
HUMAN HAIR, SKIN AND NAIL TREATMENT WITH SULFOSUCCINATE COMPOSITIONS
Wilhelm Melloh, Fulda, and Helmut Hoffmann, Steinau, Schluchtern, Germany, assignors to Rewo Chemische Fabrik G.m.b.H., Steinau, Kreis Schluchtern, Germany
No Drawing. Continuation-in-part of abandoned application Ser. No. 403,930, Oct. 14, 1964. This application Mar. 9, 1967, Ser. No. 621,801
Int. Cl. A11k 7/06
U.S. Cl. 424—70  4 Claims

ABSTRACT OF THE DISCLOSURE

Composition for treating skin, hair and the like, containing as the active ingredient a sulfosuccinate of the formula

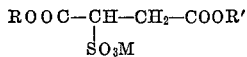

In this formula R represents a radical of total wool fat alcohols and/or total wool fatty acid monoethanolamide; M represents Na, Mg, K, $NH_4$ or monoethanolamine, and R' may be R, M and the methyl radical. The active ingredient adheres to skin and hair and the composition may be pharmaceutical or cosmetic.

---

This is a continuation-in-part application based on our pending application Ser. No. 403,930 filed Oct. 14, 1964, now abandoned.

This invention relates to novel sulfosuccinate compounds, their employment and preparation.

Frequent use has been made of wool fat and wool fat derivatives in cosmetology and dermatology, because of their emulsifying and solvent properties. Moreover the use of such compounds has additional effects namely "skin-moisturing" that is to say the producing of a suppleness of the skin and also, penetration of it, allowing other agents to act on the skin and hair. While such compounds can be modified e.g. by sulfonation to increase water-solubility or phosphatisation to increase oil-solubility—they adhere to the skin and hair by physical effect only and hence compositions containing them are easily washed off. This necessitates repeated re-application for any prolonged dermatological or cosmetic effect to be achieved.

It is an object of this invention to provide novel compounds which have the ability to adhere to skin and hair, even when the preparation in which they were applied has been washed off.

It is a further object of this invention to provide compounds which will quickly and effectively contact human (or animal) hair and skin and become water- and wash-resistant.

It is a further object of this invention to provide compounds which will effectively wet the hair and skin quickly and lastingly.

It is a further object of this invention to provide compounds, the use of which renders hair antistatic and hence enables hair-styling to be more durable.

These and other objects will appear from the following description of the invention.

This invention is based upon novel salts of sulfosuccinates of the general formula:

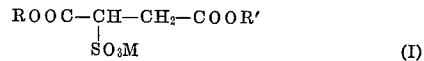

in which R represents one or more of the high molecular weight organic residues of wool fat selected from the group consisting of alcohols, fatty acid alkylolamides and fatty acid amides, M represents an acceptable cation and R' represents a radical selected from the group consisting of R, M and $CH_3$ radical.

Preferred compounds of general Formula I are: the disodium salt of sulfosuccinate ester of cholesterol; the magnesium salt of sulfosuccinic acid of total wool fat alcohols; the disodium salt of the sulfosuccinate esters of total wool fat alcohols/total wool fatty acid monoethanolamide; the sodium salt of the sulfosuccinate esters of total wool fat alcohols/total wool fatty acid monoethanolamide/methyl alcohol; and the sodium monoethanolamine salt of the sulfosuccinate ester of cholesterol.

Compositions, either pharmaceutical or cosmetic, containing a salt or salts of this invention are better than the known preparations in that they exhibit a high adhesion to skin and hair at great "absorption speed." When used in such known compositions as are washed off after a short time, the salts of this invention are spontaneously fixed as water- and wash-resistant on the skin or hair. This means that increased effective time of operation of the composition active ingredient(s) is possible. For instance, use may be made of the great water-holding capacity of wool fat products to hydrate the skin surface to effect so-called "skin-moisturizing" even by the use of soaps and such preparations; similarly because hair becomes antistatic quickly a hair-styling is given greater durability.

The salts of this invention being of sulfosuccinic acid esters obtained from wool fatty acid amides alone in admixture with wool fat alcohols also exhibit emulsifying properties and hence the use of special emulsifiers is rendered either wholly or partially redundant.

The compositions of this invention will be those adapted to or likely to come into contact with human or animal hair or skin. The compositions may be pharmaceutical, dermatological or cosmetic, and may take the form of creams, aqueous or non-aqueous based (e.g. brilliantines and lipsticks), shampoos, liquid detergents, soaps and other cleansing agents, bath salts and the like, facial packs, hair colorants, hair perfumes, hair bleaching agents, permanent hair wave preparations, hair set preparations and the like. Additives, such as emulsifiers, solvents, colorants, germicides, sun screens, deodorants, insect repellants, sequestrants and, where necessary, propellants may be present.

This invention extends to the use of such compositions in human or veterinary processes. In particular it extends to processes for the treatment of hair and skin, for cleansing of the hair and skin, and for permanently waving the hair, all of which include the step of applying such a composition.

The compounds of this invention may be prepared by a process in which a wool fat or a derivative thereof starting material is reacted with maleic acid anhydride to produce a product which is reacted with a metal sulfite or bisulfite to yield a desired compound.

For example these reactions may be represented as follows:

(a) Using one mole of wool fat alcohol to one mole of maleic acid anhydride and then metal sulfite:

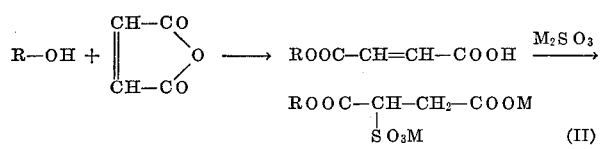

(b) Using two moles of wool fat alcohol to one mole of maleic acid anhydride and then a metal bisulfite:

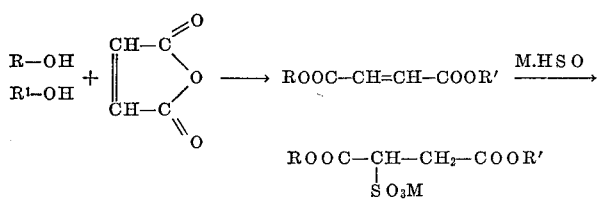

in which R, R' and M have the meanings indicated for general Formula I.

The starting material in the process just indicated may be wool fat, total wool fat alcohols, cholesterol and high molecular weight products in or derived from wool fat, namely alcohols, fatty acid alkylolamides and fatty acid amides. Of course, mixtures of any of these may be used—suffice to say that for the reaction to occur, terminal active hydrogen atoms should be present desirably provided by the compound derived from wool fat or by another compound present such as an alcohol. The derivative of wool fat may be prepared by standard techniques, e.g. by the working up of alkylolamide or ammonia into wool fat to provide the respective corresponding derivatives.

The starting material is reacted with maleic acid anhydride and the latter should be used in an amount corresponding to the total hydroxyl number of the former. For instance, the starting material and maleic acid anhydride can be reacted in 2:1 mole ratio, or 1:1 mole ratio when the product will be converted with a further mole of a compound containing an active hydrogen atom, for instance an alcohol such as methyl alcohol.

The sulfonation stage can be carried out by a variety of metal sulfites or bisulfites e.g. disodium sulfite, sodium bisulfite, diammonium sulfite, different dimetal sulfites (e.g. sodium magnesium sulfite) and the like, the only limitation imposed on the cation(s) being that it or they be pharmaceutically or cosmetically acceptable i.e. non-toxic, non-irritant and non-detrimental to the activity of other ingredients present in the final composition.

The sulfonation may be complete or only partial and this will influence the properties of the final compound e.g. its water-solubility.

Some isomers and/or side-products may be present in the final product depending on the reactants and the reaction conditions but those skilled in the art will realize that, unless these exert an irritant, toxic or otherwise harmful effect, removal thereof is not necessary. Of course, these products could be removed, and the salt or salts proper isolated for subsequent use in the compositions but generally speaking, such procedure is not required and to be avoided for economic reasons.

This invention relates also to the products of the process just described, except the cholesterol derivatives.

In order that this invention may be well understood, it will now be described with reference to the following examples given by way of illustration only. Examples I to V are illustrative of the process of the invention, and Examples VI to XI the formulation of the products into compositions.

EXAMPLE I

Preparation of the disodium salt of the sulfo-succinic acid ester of cholesterol Cholesterol is reacted with maleic acid anhydride in a 1:1 mole ratio at 140–150° C. for 30 minutes with stirring as required. The reaction product, which is a liquid at 140–150° C., is poured into an aqueous sodium sulfite solution (containing 1 mol of sodium sulfite per mol of reaction product) at 80–90° C. with strong agitation. After 30–60 minutes, the sulfonation reaction is terminated.

This compound, takes the form of a white, cream-like mass.

EXAMPLE II

Preparation of the magnesium salt of the sulfo-succinic acid of the alcohols in wool fat Maleic acid anhydride is reacted with wool fat alcohol in a molecular ratio of 1:1 at 90° C. for 30 mintues with stirring as required. The amount of acid anhydride required is determined by the total hydroxyl number of the wool fat alcohol. The reaction product is poured into an aqueous suspension of magnesium sulfite (containing 1 mol magnesium sulfite per mol of reaction product), at 90° C. with strong stirring.

This compound which has never previously been described is an almost white, cream-like mass.

EXAMPLE III

Preparation of the disodium salt of the sulfosuccinic acid ester of a total wool fat alcohol/total wool fatty acid monoethanol amide mixture Lanolin and monoethanolamine are heated together in a mole ratio of 1:1 in the presence of 0.5% of sodium methylate for 2–3 hours at 80–90° C. The product is a yellowish wax containing wool fat alcohols and wool fatty acid monoethanolamide with a free amine titrable content of less than 1%. The product is esterified with maleic acid anhydride used in 1:1 mol ratio (relative to the product hydroxyl number) by heating at 90° C. for 30 minutes.

The resultant product is run into an aqueous solution of sodium sulfite, (of a concentration such that 1 mol of sodium sulfite is present per mol of reaction product), at 80–90° C. with strong stirring. Sulfonation is finished after 30–60 minutes.

This compound has never previously been described and takes the form of an almost white, cream-like mass.

EXAMPLE IV

Preparation of the sodium salt of the sulfosuccinic acid ester of total wool fat alcohol/total wool fatty acid monoethanol amide/methyl alcohol Lanolin and monoethanolamine are reacted in the manner described in Example III, and the product is esterified with maleic acid anhydride at 80–90° C. for 30 minutes. The resultant product is allowed to stand overnight in ethereal solution with an excess of diazomethane. After evaporating the ether off, the product has an acid number of under 5.

The reaction product is poured into an aqueous sodium bisulfite solution admixed with about 5% of sodium sulfite, preheated to 100° C. with strong stirring, (the sodium bisulfite solution contains 1 mol of sodium bisulfite per mol of reaction product.)

EXAMPLE V

Preparation of the sodium monoethanolamine salt of the sulfoscuccinic acid ester of cholesterol Cholesterol and maleic acid anhydride are mutually reacted in the manner of Example I, and the reaction product is passed into an aqueous solution of sodium monoethanolamine sulfite (containing 1 mol of sodium monoethanolamine sulfite per mol of reaction product), at 80–90° C. with strong stirring. Sulfonation is finished after 30–60 minutes.

EXAMPLE VI

Formulation of a cream 25 g. of cetyl/stearyl alcohol, 7.5 g. of a 30% aqueous suspension of the final product of Example III and 3 g. of oleic acid oleyl ester are heated to 80° C. and emulsified by stirring at that temperature with a mixture of 5 g. of glycerin and 59.5 ml. of water.

The cream thus obtained can be used as a cosmetic day cream and gives an agreeable, and enduring velvety feel to the skin.

Pharmaceutically active substances, such as, for example, boric acid, sulphur, zinc oxide, sulfonamide, penicillin, can be added to this cream for specialized applications.

EXAMPLE VII

Preparation of a cream 24 g. cetyl alcohol, 24.4 g. sodium cetyl sulfate, 16 g. oleic acid oleyl ester and 5 g. of a 30% aqueous suspension of the final product of Example I are emulsified at 70–80° C. with 52.6 ml. of water. A cream is obtained with properties and applications similar to those in Example VI.

EXAMPLE VIII

Preparation of a shampoo 10 g. of an aqueous 28% solution of coconut oil alcohol sodium diglycolethersulfate, 5.6 g. stearic acid and 2 g. of a 30% aqueous suspension of the final product of Example III are stirred and homogenized at 80° C. with a solution of 0.8 g. of sodium hydroxide in 81 ml. of water. The pH value is then adjusted to 6.5–7.0 with a few drops of concentrated phosphoric acid, the product stirred well and allowed to cool.

The product is a ready-to-use cream shampoo with a beautiful pearly luster, which makes hair antistatic and gives it an abundantly soft feel.

EXAMPLE IX

Preparation of a lotion 0.1 g. of an aqueous 30% suspension of the final product of Example I is stirred into 50 ml. of water at 80° C. with 50 ml. of 96% ethyl alcohol containing 0.5 g. of a perfumed oil. The whole is mixed and, after standing overnight, is filtered to provide a hair lotion for daily use which gives to the hair an abundant feel, improves combability and leads to a longer durability of the hair-styling.

EXAMPLE X

Preparation of a hand cream and finger nail solution 5 g. of an aqueous 30% suspension of the product of Example III was diluted with 95 ml. of hot water and allowed to cool to provide a turbid colloidal solution which can be used for the treatment of roughened and cracked hands and also for the treatment of brittle finger nails.

EXAMPLE XI

Preparation of a cream

In order to prepare a cream, 25 g. of cetyl/stearyl alcohol, 11 g. of a 30% aqueous suspension of the final product of Example III and 3 g. of oleic acid oleyl ester are heated to 80° C. and emulsified at 80° C. with a mixture of 5 g. of glycerin and 56 ml. of water.

The cream thus obtained can be used as a cosmetic day cream and gives an agreeable and enduring velvety feel to the skin.

It will be understood from the above that the present invention can be carried out with various modifications.

Thus, the proportion by weight of the sulfosuccinate compound incorporated in the products prepared as described in the above examples calculated on the sum of the weights of conventional active ingredients in said products—varies between 0.05 and 10%. The term "conventional active ingredients" is used to include the total weight of ingredients in said products with the exception of the sulfosuccinate compound and the water present in the composition or the like. In compositions consisting essentially of an aqueous dispersion of the sulfosuccinate compound in water, the proportion of said sulfosuccinate varies also between 0, 1 and 10%, calculated on the weight of said dispersion. Any proportion within the above stated ranges can be used in carrying out the claimed invention.

The parts and percents stated herein are by weight if not otherwise stated.

What is claimed is:

1. A composition which comprises an aqueous suspension of a material selected from the group consisting of sulfosuccinates of the formula

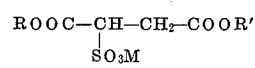

and mixtures thereof, where in said formula R represents a radical selected from the group consisting of radicals of total wool fat alcohols, total wool fattry acid monoethanolamide and mixtures thereof, M is selected from the group consisting of sodium, potassium, ammonium, magnesium, monoethanolamine and mixtures thereof, R' is selected from the group consisting of R. M, and the $CH_3$ radical, said composition containing 0.1–10% by weight of said material calculated on the weight of the aqueous suspension.

2. A process for treating human hair to render it antistatic and improve its combability which comprises applying to it an effective amount of a material selected from the group consisting of a sulfosuccinate of the formula

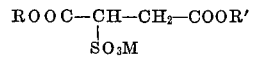

and mixtures thereof, wherein said R represents a radical selected form the group consisting of radicals of total wool fat alcohols, total wool fatty acid monoethanolamide and mixtures thereof, M is selected from the group consisting of sodium, potassium, ammonium, magnesium, monoethanolamine, and mixtures thereof, R' is selected from the group consisting of R, M, and the $CH_3$ radical, in a cream or lotion carrier.

3. A composition comprising an adhesive effective amount of a material selected from the group consisting of sulfosuccinates of the formula

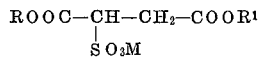

and mixtures thereof, wherein said formula R represents a radical selected from the group consisting of radicals of total wool fat alcohols, total wool fatty acid monoethanolamide and mixture thereof, M is selected from the group consisting of sodium, potassium, ammonium, magnesium, monoethanolamine and mixtures thereof, R' is selected from the group consisting of R, M, and the $CH_3$ radical, and a cream or lotion carrier.

4. A process for treating human skin to hydrate the same which comprises applying to it an effective amount of a material selected from the group consisting of a sulfosuccinate of the formula

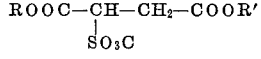

and mixtures thereof, wherein said R represents a radical selected from the group consisting of radicals of total wool fat alcohols, total wool fatty acid monoethanolamide and mixtures thereof, M is selected from the group consisting of sodium, potassium, ammonium, magnesium, monoethanolamine, and mixtures thereof, R' is selected from the group consisting of R, M, and the $CH_3$ radical, in a cream or lotion carrier.

References Cited

UNITED STATES PATENTS

| | | | |
|---|---|---|---|
| 2,166,144 | 7/1939 | Harris | 260—481 |
| 2,176,423 | 10/1939 | Jaeger | 260—481 |
| 2,236,528 | 4/1941 | Epstein et al | 260—401 |
| 2,236,529 | 4/1941 | Epstein et al. | 260—401 |
| 2,236,430 | 4/1941 | Epstein et al. | 260—401 |
| 3,404,164 | 10/1968 | Dutton et al. | 260—397.2 |

ALBERT T. MEYERS, Primary Examiner

V. C. CLARKE, Assistant Examiner

U.S. CL. X.R.

8—101; 252—152, 161; 260—397.2, 400, 401; 424—59, 61, 62, 64, 71, 72, 175, 148, 164, 271, 321, 365